(12) United States Patent
Teshima et al.

(10) Patent No.: US 12,122,911 B2
(45) Date of Patent: Oct. 22, 2024

(54) POLYALKYLENE ETHER GLYCOL COMPOSITION AND METHOD FOR PRODUCING POLYURETHANE USING THE SAME

(71) Applicant: Mitsubishi Chemical Corporation, Tokyo (JP)

(72) Inventors: Gaku Teshima, Tokyo (JP); Ryo Yamashita, Tokyo (JP); Shohei Taniguchi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 610 days.

(21) Appl. No.: 17/305,602

(22) Filed: Jul. 12, 2021

(65) Prior Publication Data
US 2021/0332238 A1    Oct. 28, 2021

Related U.S. Application Data

(63) Continuation of application No. PCT/JP2020/009140, filed on Mar. 4, 2020.

(30) Foreign Application Priority Data

Mar. 28, 2019 (JP) .................. 2019-063409

(51) Int. Cl.
  *C08G 65/26*    (2006.01)
  *C08G 18/48*    (2006.01)
  *C08L 71/02*    (2006.01)
  *C08G 101/00*   (2006.01)

(52) U.S. Cl.
  CPC ........... *C08L 71/02* (2013.01); *C08G 18/4841* (2013.01); *C08G 18/4845* (2013.01); *C08G 18/4858* (2013.01); *C08G 65/26* (2013.01); *C08G 65/2606* (2013.01); *C08G 2101/00* (2013.01); *C08L 2203/14* (2013.01)

(58) Field of Classification Search
  CPC ............... C08G 65/26; C08G 65/2606; C08G 18/4845; C08G 18/4841; C08G 18/485
  See application file for complete search history.

(56) References Cited

U.S. PATENT DOCUMENTS

| | | | |
|---|---|---|---|
| 2005/0170991 A1* | 8/2005 | Ruland | C07C 43/11 510/505 |
| 2005/0181967 A1* | 8/2005 | Ruland | A01N 25/30 510/505 |
| 2015/0299376 A1 | 10/2015 | Miyata et al. | |

FOREIGN PATENT DOCUMENTS

| | | |
|---|---|---|
| JP | 7-228685 A | 8/1995 |
| JP | 10-251508 A | 9/1998 |
| JP | 2000-072844 A | 3/2000 |
| JP | 2004-099643 A | 4/2004 |
| JP | 2014-169361 A | 9/2014 |
| JP | 2014-234406 A | 12/2014 |
| JP | 2015-214606 A | 12/2015 |
| WO | WO 2014/069556 A1 | 5/2014 |

OTHER PUBLICATIONS

International Search Report issued May 26, 2020 in PCT/JP2020/009140 filed on Mar. 4, 2020, 2 pages.
Extended European Search Report issued Apr. 22, 2022 in European Patent Application No. 20778180.8, 5 pages.

\* cited by examiner

*Primary Examiner* — Michael L Leonard
(74) *Attorney, Agent, or Firm* — Oblon, McClelland, Maier & Neustadt, L.L.P.

(57) ABSTRACT

A polyalkylene ether glycol composition including a polyalkylene ether glycol including an alkoxy group serving as a terminal group. The polyalkylene ether glycol composition has a hydroxyl value of 220 or more and 750 or less. The ratio of the number of alkoxy group terminals of the polyalkylene ether glycol included in the polyalkylene ether glycol composition to the number of hydroxyl group terminals of polyalkylene ether glycols included in the polyalkylene ether glycol composition is 0.00001 or more and 0.0040 or less. Provided is a polyalkylene ether glycol composition having excellent compatibility with low-molecular-weight polyols, having suitable reactivity when used as a raw material for polyurethanes, and capable of achieving intended physical properties.

12 Claims, No Drawings

POLYALKYLENE ETHER GLYCOL COMPOSITION AND METHOD FOR PRODUCING POLYURETHANE USING THE SAME

TECHNICAL FIELD

The present invention relates to a polyalkylene ether glycol composition and a method for producing a polyurethane using the polyalkylene ether glycol composition.

BACKGROUND ART

Polyurethanes have been applied to various fields. Polyurethanes are classified as follows by the type of the raw material polyol constituting the soft segment domain, which is the principal part of a polyurethane: a polyether polyol-type polyurethane produced using polypropylene glycol, polytetramethylene ether glycol, or the like; a polyester polyol-type polyurethane produced using a dicarboxylic acid polyester or the like; a polylactone-type polyurethane produced using a polycaprolactone or the like; and a polycarbonate-type polyurethane produced by the reaction of a carbonate source and a diol.

Among these, a polyurethane produced using a polyalkylene ether glycol as a polyol component is particularly excellent in terms of abrasion resistance, hydrolysis resistance, and elastic recoverability and has been used in various applications, such as production of polyurethane elastomers, polyurethane foams, synthetic and artificial leathers, or the like. There has recently been a demand particularly for polyurethane elastomers and polyurethane foams having further high mechanical properties and further high rebound resilience appropriate to intended applications.

A polyurethane elastomer softens when heated and hardens when cooled subsequently. A cured product of a polyurethane elastomer is excellent in terms of elasticity, mechanical strength, low-temperature characteristics, abrasion resistance, weather resistance, and oil resistance. A cured product of a polyurethane elastomer also has excellent workability and can be readily worked into various shapes. Polyurethane elastomers have been widely used primarily for producing industrial components, such as a roller and a caster; automotive components, such as a solid tire and a belt; office automation equipment components, such as a paper feed roller and a roller for copying machines; and sporting and leisure goods.

Polyurethane foams are classified into a rigid polyurethane foam, a flexible polyurethane foam, and a semi-rigid polyurethane foam, which stands midway between rigid and flexible polyurethane foams in terms of properties, by foam density. Polyurethane foams have excellent shock absorption, certain rebound resilience, low compression strain, and certain durability and can be readily worked into various shapes. Polyurethane foams have been widely used primarily for producing thermal insulators and isolators for electronic devices and buildings, automotive seats, automotive ceiling cushions, beddings, such as a mattress, insoles, midsoles, and shoe soles.

Raw materials including an isocyanate compound, a low-molecular-weight polyol, and a high-molecular-weight component, such as a polyether polyol, have been commonly used for producing polyurethane elastomers and polyurethane foams. In order to improve the compatibility between the low- and high-molecular-weight polyol components, a polyol component having a molecular weight intermediate therebetween may be used.

PTL 1 discloses a technique in which a polytetramethylene ether glycol having a specific number-average molecular weight and a low-molecular-weight glycol are used as glycol components in order to produce a polyurethane elastomer having excellent formability and excellent mechanical properties.

In PTL 2, a technique in which a polytetramethylene ether glycol having a specific number-average molecular weight is used as a polyol and 1,4-butanediol and trimethylolpropane are used in combination with each other as active hydrogen compounds in order to produce a urethane elastomer having a low initial elasticity, high elongation characteristics, and suitable low-temperature characteristics is described.

PTL 3 proposes a polyurethane foam produced by using a polytetramethylene ether glycol having a specific number-average molecular weight as a polyol and a low-molecular-weight dipropylene glycol or glycerin as a chain extender in order to produce a polyurethane foam having an excellent shape memory property.

PTL 1: JP 2000-72844 A
PTL 2: JP 2004-99643 A
PTL 3: JP 2014-234406 A

The polyalkylene ether glycols known in the related art have the following problems:

In the case where the above polyalkylene ether glycols are used as a raw material for producing a polyurethane, the reaction uniformity is not at a sufficient level and, consequently, the phase separation structure of the resulting polyurethane, which is constituted by hard and soft segments, fails to be uniform. Therefore, the resulting polyurethane may fail to have intended physical properties.

SUMMARY OF INVENTION

An object of the present invention is to provide a polyalkylene ether glycol composition having excellent compatibility with a low-molecular-weight polyol used as a chain extender and a high-molecular-weight polyalkylene ether glycol used as another polyol component, having suitable reactivity when used as a raw material for producing a polyurethane, and capable of achieving intended physical properties. Another object of the present invention is to provide a method for producing a polyurethane using the above polyalkylene ether glycol composition.

The inventor of the present invention found that the above-described issues may be addressed by a polyalkylene ether glycol composition including a polyalkylene ether glycol including an alkoxy group serving as a terminal group, wherein the polyalkylene ether glycol composition has a hydroxyl value that falls within a specific range, and wherein a ratio of the number of alkoxy group terminals of the polyalkylene ether glycol included in the polyalkylene ether glycol composition to the number of hydroxyl group terminals of polyalkylene ether glycols included in the polyalkylene ether glycol composition falls within a specific range.

For example, in the case where the polyalkylene ether glycol composition according to the present invention is used as a raw material for producing a polyurethane, the polyalkylene ether glycol composition has suitable compatibility with other raw materials, that is, in particular, a low-molecular-weight polyol used as a chain extender, such as 1,4-butanediol, and a high-molecular-weight polyalkylene ether glycol used as another polyol component. This increases the reaction uniformity and improves the uniformity of the microphase separation structure of the resulting polyurethane. As a result, the resulting polyurethane may have intended physical properties.

The present invention is as described below.

[1] A polyalkylene ether glycol composition comprising a polyalkylene ether glycol including an alkoxy group serving as a terminal group,
wherein the polyalkylene ether glycol composition has a hydroxyl value of 220 or more and 750 or less, and
wherein a ratio of the number of alkoxy group terminals of the polyalkylene ether glycol including an alkoxy group serving as a terminal group, the polyalkylene ether glycol being included in the polyalkylene ether glycol composition, to the number of hydroxyl group terminals of polyalkylene ether glycols included in the polyalkylene ether glycol composition is 0.00001 or more and 0.0040 or less.

[2] The polyalkylene ether glycol composition according to [1], wherein the polyalkylene ether glycol composition includes a dialkylene ether glycol, and a ratio of the number of the alkoxy group terminals of the polyalkylene ether glycol including an alkoxy group serving as a terminal group, the polyalkylene ether glycol being included in the polyalkylene ether glycol composition, to the number of hydroxyl group terminals of the dialkylene ether glycol is 0.0001 or more and 0.025 or less.

[3] The polyalkylene ether glycol composition according to [2], wherein the number of the hydroxyl group terminals of the dialkylene ether glycol is 2.5 mmol/g or more and 8.6 mmol/g or less.

[4] The polyalkylene ether glycol composition according to any one of [1] to [3], wherein the number of the alkoxy group terminals of the polyalkylene ether glycol including an alkoxy group serving as a terminal group, the polyalkylene ether glycol being included in the polyalkylene ether glycol composition, is 0.001 mmol/g or more and 0.07 mmol/g or less.

[5] The polyalkylene ether glycol composition according to any one of [1] to [4], wherein the polyalkylene ether glycols are polytetramethylene ether glycols.

[6] The polyalkylene ether glycol composition according to any one of [1] to [5], wherein the polyalkylene ether glycols and the polyalkylene ether glycol including an alkoxy group serving as a terminal group have the same structural unit.

[7] The polyalkylene ether glycol composition according to [2] or [3], wherein the polyalkylene ether glycols and the dialkylene ether glycol have the same structural unit.

[8] The polyalkylene ether glycol composition according to any one of [1] to [7], wherein the alkoxy group is an alkoxy group including 4 or less carbon atoms.

[9] The polyalkylene ether glycol composition according to [8], wherein the alkoxy group is a methoxy group.

[10] A method for producing a polyurethane, the method comprising conducting addition polymerization reaction of a raw material including the polyalkylene ether glycol composition according to any one of [1] to [9], a compound including a plurality of isocyanate groups, a polyol having a molecular weight of 50 to 300, and a polyalkylene ether glycol having a hydroxyl value of 200 or less.

[11] The method for producing a polyurethane according to [10], wherein the polyurethane is a polyurethane elastomer.

[12] The method for producing a polyurethane according to [11], wherein the polyurethane elastomer is a polyurethane foam.

Advantageous Effects of Invention

The present invention provides a polyalkylene ether glycol composition having suitable compatibility with a low-molecular-weight polyol, such as 1,4-butanediol, and a high-molecular-weight polyalkylene ether glycol used as another polyol component.

In the case where the polyalkylene ether glycol composition according to the present invention is used as a raw material for producing a polyurethane, the polyalkylene ether glycol composition has suitable compatibility with other raw materials. This increases the reaction uniformity and improves the uniformity of the microphase separation structure of the resulting polyurethane. As a result, the resulting polyurethane may have intended physical properties.

DESCRIPTION OF EMBODIMENTS

Details of an embodiment of the present invention are described below. The following description of the elements is merely an example of an aspect of the present invention and does not limit the present invention.

[Polyalkylene Ether Glycol Composition]

A polyalkylene ether glycol composition according to the present invention includes a polyalkylene ether glycol including an alkoxy group serving as a terminal group (hereinafter, may be referred to as "terminal alkoxy group PAEG").

The hydroxyl value of the polyalkylene ether glycol composition according to the present invention is 220 or more and 750 or less, is preferably 280 or more and 700 or less, and is more preferably 370 or more and 660 or less. When the above hydroxyl value falls within the above range, the compatibility of the polyalkylene ether glycol composition with a low-molecular-weight polyol and a high-molecular-weight polyalkylene ether glycol used as another polyol component may be further increased.

The hydroxyl value (unit: mg-KOH/g) of the polyalkylene ether glycol composition can be determined in accordance with JIS K1557-1.

The ratio of the number of alkoxy group terminals of the terminal alkoxy group PAEG included in the polyalkylene ether glycol composition according to the present invention (hereinafter, this number may be referred to as "PAEG alkoxy group terminal number") to the number of hydroxyl group terminals of polyalkylene ether glycols included in the polyalkylene ether glycol composition (hereinafter, this number may be referred to as "PAEG hydroxyl group terminal number") is 0.00001 or more and 0.0040 or less. The above ratio is preferably 0.0001 or more, is more preferably 0.0005 or more, and is further preferably 0.001 or more. The above ratio is preferably 0.035 or less, is more preferably 0.030 or less, and is further preferably 0.025 or less. When the above ratio falls within the above-described range, the compatibility of the polyalkylene ether glycol composition with a low-molecular-weight polyol and a high-molecular-weight polyalkylene ether glycol used as another polyol component may be further increased.

The hydroxyl group terminals of polyalkylene ether glycols included in the polyalkylene ether glycol composition according to the present invention (PAEG hydroxyl group terminal number) is preferably 10.0 mmol/g or more and is more preferably 13.2 mmol/g or more. The hydroxyl group terminal number is preferably 25.0 mmol/g or less and is more preferably 23.5 mmol/g or less. When the PAEG hydroxyl group terminal number is equal to or less than the upper limit, the compatibility of the polyalkylene ether glycol composition with a high-molecular-weight polyalkylene ether glycol used as another polyol component may be increased. When the PAEG hydroxyl group terminal number is equal to or more than the lower limit, the compatibility of the polyalkylene ether glycol composition with a low-molecular-weight polyol may be increased.

The polyalkylene ether glycol composition according to the present invention preferably includes a dialkylene ether glycol as a part of the polyalkylene ether glycols. The ratio of the number of alkoxy group terminals of the terminal alkoxy group PAEG included in the polyalkylene ether glycol composition according to the present invention (PAEG alkoxy group terminal number) to the number of hydroxyl group terminals of the dialkylene ether glycol included in the polyalkylene ether glycol composition (hereinafter, this number may be referred to as "DAEG hydroxyl group terminal number") is preferably 0.0001 or more and 0.025 or less. The above ratio is more preferably 0.0005 or more and is further preferably 0.001 or more. The above ratio is more preferably 0.02 or less and is further preferably 0.01 or less. When the above ratio falls within the above range, the compatibility of the polyalkylene ether glycol composition with a low-molecular-weight polyol and a high-molecular-weight polyalkylene ether glycol used as another polyol component may be further increased.

The number of hydroxyl group terminals of the dialkylene ether glycol included in the polyalkylene ether glycol composition according to the present invention (DAEG hydroxyl group terminal number) is preferably 2.5 mmol/g or more and is more preferably 3.7 mmol/g or more. The above hydroxyl group terminal number is preferably 8.6 mmol/g or less and is more preferably 7.4 mmol/g or less. The DAEG hydroxyl group terminal number is preferably 2.5 mmol/g or more and 8.6 mmol/g or less, is more preferably 2.5 mmol/g or more and 7.4 mmol/g or less, and is further preferably 3.7 mmol/g or more and 7.4 mmol/g or less. When the DAEG hydroxyl group terminal number is equal to or less than the upper limit, the compatibility of the polyalkylene ether glycol composition with a high-molecular-weight polyalkylene ether glycol used as another polyol component may be increased. When the DAEG hydroxyl group terminal number is equal to or more than the lower limit, the compatibility of the polyalkylene ether glycol composition with a low-molecular-weight polyol may be increased.

The numbers of hydroxyl group terminals of the dialkylene ether glycol and the polyalkylene ether glycols can be determined by calculation on the basis of the concentration of polyalkylene ether glycols measured by gas chromatography.

The number of alkoxy group terminals of the terminal alkoxy group PAEG included in the polyalkylene ether glycol composition according to the present invention is preferably 0.001 mmol/g or more and is more preferably 0.005 mmol/g or more. The above alkoxy group terminal number is preferably 0.07 mmol/g or less, is more preferably 0.05 mmol/g or less, and is further preferably 0.03 mmol/g or less. The above alkoxy group terminal number is preferably 0.001 mmol/g or more and 0.07 mmol/g or less, is more preferably 0.001 mmol/g or more and 0.05 mmol/g or less, and is further preferably 0.005 mmol/g or more and 0.03 mmol/g or less. When the number of alkoxy group terminals of the terminal alkoxy group PAEG included in the polyalkylene ether glycol composition is equal to or less than the upper limit, the compatibility of the polyalkylene ether glycol composition with a low-molecular-weight polyol and a high-molecular-weight polyalkylene ether glycol used as another polyol component may be increased. When the above alkoxy group terminal number is equal to or more than the lower limit, the compatibility of the polyalkylene ether glycol composition with a high-molecular-weight polyalkylene ether glycol may be increased.

The number of alkoxy group terminals of the terminal alkoxy group PAEG included in the polyalkylene ether glycol composition can be measured by nuclear magnetic resonance (NMR).

Examples of the polyalkylene ether glycols included in the polyalkylene ether glycol composition according to the present invention include polypropylene glycol, polytrimethylene ether glycol, polytetramethylene ether glycol, polyhexamethylene ether glycol, poly(3-methyl)-tetramethylene ether glycol, and a copolymer polyether polyol including 1 to 20 mol % of 3-methyltetrahydrofuran and 80 to 99 mol % of tetrahydrofuran. In consideration of the mechanical strength and flexibility of a polyurethane produced using the polyalkylene ether glycol composition, polytetramethylene ether glycol is preferable.

The composition of the polyalkylene ether glycol can be analyzed by nuclear magnetic resonance (NMR).

The polyalkylene glycols included in the polyalkylene ether glycol composition preferably have the same structural unit as the terminal alkoxy group PAEG. The term "structural unit" used herein refers to a repeating unit excluding a terminal group. When the polyalkylene glycols and the terminal alkoxy group PAEG have the same structural unit, the compatibility of the polyalkylene ether glycol composition with a low-molecular-weight polyol and a high-molecular-weight polyalkylene ether glycol used as another polyol component may be increased.

The polyalkylene glycols included in the polyalkylene ether glycol composition which are other than the dialkylene ether glycol and the dialkylene ether glycol preferably have the same structural unit. The term "structural unit" used herein refers to a repeating unit excluding a terminal group. When the other polyalkylene glycols and the dialkylene ether glycol have the same structural unit, the compatibility of the polyalkylene ether glycol composition with a low-molecular-weight polyol and a high-molecular-weight polyalkylene ether glycol used as another polyol component may be increased.

The alkoxy group included in the terminal alkoxy group PAEG is preferably an alkoxy group including 4 or less carbon atoms and is more preferably a methoxy group. The smaller the number of carbon atoms included in the alkoxy group, the higher the compatibility of the polyalkylene ether glycol composition with a low-molecular-weight polyol and a high-molecular-weight polyalkylene ether glycol used as another polyol component.

The polyalkylene glycol composition according to the present invention may include a cyclic oligomer derived from a structural unit constituting the polyalkylene ether glycols or the like included in the polyalkylene ether glycol composition. The concentration of the cyclic oligomer in the polyalkylene glycol composition is preferably 0.1% by weight or more, is more preferably 0.3% by weight or more, and is further preferably 0.5% by weight or more; and is preferably 5.0% by weight or less, is more preferably 4% by weight or less, and is further preferably 3% by weight or less. When the above concentration is equal to or more than the above lower limit, the compatibility of the polyalkylene ether glycol composition with a high-molecular-weight polyalkylene ether glycol may be increased. When the above concentration is equal to or less than the above upper limit, the amount of unreacted precipitates formed when the polyalkylene ether glycol composition is used as a raw material for producing a polyurethane may be reduced.

The polyalkylene glycol composition according to the present invention may include a component having an acetal structure. The concentration of the component having an acetal structure in the polyalkylene ether glycol composition is preferably 0.001 mmol/g or more, is more preferably 0.005 mmol/g or more, and is further preferably 0.01 mmol/g or more; and is preferably 0.5 mmol/g or less, is more preferably 0.3 mmol/g or less, and is further preferably 0.1 mmol/g or less. When the above concentration is equal to or more than the lower limit, the compatibility of the polyalkylene ether glycol composition with a high-molecular-weight polyalkylene ether glycol may be increased. When the above concentration is equal to or less than the upper limit, the crosslinking reaction that occurs when the polyalkylene ether glycol composition is used as a material for producing a polyurethane is suppressed and, consequently, gelation is reduced.

[Method for Producing Polyalkylene Ether Glycol]

An example of the method for producing the polyalkylene ether glycol composition according to the present invention is a method including performing a ring-opening polymerization of a cyclic ether and/or derivative thereof with a carboxylic anhydride, such as acetic anhydride, in the presence of a solid acid catalyst including a composite metal oxide or the like to produce a polyalkylene ether glycol diester, and subsequently performing, in the presence of an alkali catalyst, a hydrolysis of the polyalkylene ether glycol diester or ester interchange between the polyalkylene ether glycol diester and a lower alcohol to produce a polyalkylene ether glycol.

<Cyclic Ether and Derivative Thereof>

The cyclic ether and the derivative thereof which are used as a raw material in the ring-opening polymerization reaction are not limited. The number of carbon atoms constituting the cyclic ether is commonly 2 to 10 and is preferably 3 to 7. Specific examples of the cyclic ether include tetrahydrofuran (THF), ethylene oxide, propylene oxide, oxetane, tetrahydropyran, oxepane, and 1,4-dioxane. Among these, THF is preferable in consideration of reactivity and industrial needs for products. A cyclic ether the cyclic hydrocarbon of which is partially replaced with an alkyl group, a halogen atom, or the like may also be used. Examples of such a cyclic ester include, when the cyclic ether is THF, 3-methyl-tetrahydrofuran and 2-methyltetrahydrofuran. The above cyclic ethers may be used alone or in a mixture of two or more.

<Carboxylic Anhydride>

A carboxylic anhydride may be used as an assistant (polymerization reaction initiator) in the ring-opening polymerization reaction. Examples of the carboxylic anhydride include a carboxylic anhydride derived from an aliphatic or aromatic carboxylic acid which normally includes 2 to 12 carbon atoms and preferably includes 2 to 8 carbon atoms. The carboxylic acid used as a raw material for the carboxylic anhydride is preferably a monocarboxylic acid but may be a polycarboxylic acid. Specific examples of the carboxylic acid include aliphatic carboxylic acids, such as acetic acid, propionic acid, butyric acid, valeric acid, caproic acid, heptanoic acid, caprylic acid, pelargonic acid, maleic acid, and succinic acid; and aromatic carboxylic acids, such as benzoic acid, phthalic acid, and naphthoic acid. Among these, an anhydride derived from an aliphatic carboxylic acid is preferably used in consideration of costs and ease of availability. Acetic anhydride is preferably used in consideration of reactivity and the supply and demand of the products.

The amount of the carboxylic anhydride used is not limited. The amount of the carboxylic anhydride used is commonly 3 mol % or more, is preferably 4 mol % or more, and is more preferably 5 mol % or more; and is commonly 30 mol % or less, is preferably 28 mol % or less, is more preferably 26 mol % or less, and is further preferably 25 mol % or less of the total amount of the cyclic ether and/or derivative thereof used as a raw material. When the amount of the carboxylic anhydride used is equal to or less than the upper limit, the likelihood of stains resulting from the carboxylic anhydride in the ring-opening polymerization reaction or in a heating step conducted subsequent to the ring-opening polymerization reaction is reduced and, consequently, the resulting polyalkylene ether glycol diester has good hues. When the amount of the carboxylic anhydride used is equal to or more than the lower limit, a sufficient rate of the ring-opening polymerization reaction can be achieved and, consequently, the polyalkylene ether glycol diester can be produced with efficiency.

<Polymerization Catalyst>

The acid catalyst used in the ring-opening polymerization reaction is not limited and may be any acid catalyst capable of conducting the ring-opening polymerization of the cyclic ether. The polymerization catalyst is preferably a solid acidic catalyst having Lewis acidity. A solid acid catalyst composed of a metal oxide is suitably used as a solid acidic catalyst. The metal oxide is preferably a metal oxide of a metal element belonging to the third, fourth, thirteenth, or fourteenth group of the long-form periodic table (according to the IUPAC Nomenclature of Inorganic Chemistry, revised edition (1998); hereinafter, referred to as "periodic table") or a composite oxide including such a metal element. Specifically, a metal oxide such as yttrium oxide, titania, zirconia, alumina, or silica; or a composite oxide such as zirconia silica, hafnia silica, silica alumina, titania silica, or titania zirconia is preferable. Alternatively, a composite oxide that includes any of the above composite oxides and another metal element may be used.

Examples of the method for preparing the solid acid catalyst used in the ring-opening polymerization reaction include a method in which an acid, an alkali, or water is added, as needed, to a mixed solution including a salt or alkoxide of one or more metals selected from the metal elements belonging to the third, fourth, thirteenth, and fourteenth groups of the periodic table in order to form a precipitate or gel as a precursor of the solid acid catalyst. Examples of the method for forming the precipitate or gel include coprecipitation, a sol-gel process, a kneading method, and an impregnation method. In the present invention, it is preferable to use a method in which a metal salt and/or metal alkoxide is deposited on an appropriate carrier and subsequently brought into contact with a basic substance, such as an alkali or an amine, in a solid-phase state (state in which the water content is substantially zero) in order to produce a precursor of the solid acid catalyst.

The above precursor of the solid acid catalyst is filtered, cleaned, and dried as needed and subsequently baked in an inert gas atmosphere, such as a nitrogen or argon atmosphere, or in an oxidizing gas atmosphere, such as an air or diluted oxygen gas atmosphere to form an intended (composite) oxide. The heating and baking temperature is commonly 600° C. to 1150° C. and is preferably 700° C. to 1000° C. When baking is performed within the above temperature range, a solid acid catalyst having excellent reactivity and excellent stability can be produced.

The amount of the catalyst used in the ring-opening polymerization reaction varies depending on whether the reaction is conducted in a fixed-bed or slurry-bed mode and whether the reaction is performed in a continuous or batch mode. In the case where the reaction is conducted in a slurry-bed, continuous mode, commonly, the proportion of the amount of the catalyst used to the total amount of all the compounds used in the reaction system is preferably 0.001% by weight or more, is more preferably 0.01% by weight or more, and is further preferably 0.1% by weight or more; and is preferably 50% by weight or less, is more preferably 30% by weight or less, and is further preferably 20% by weight or less.

<Transformation of Terminals to Hydroxyl Groups>

The polyalkylene ether glycol diester produced by the ring-opening polymerization of the cyclic ether can be transformed to a polyalkylene ether glycol by a method known in the related art, such as a method in which a hydrolysis or transesterification reaction is conducted.

For example, in the case where THF is used as a cyclic ether, polytetramethylene ether glycol diester (hereinafter, may be referred to as "PTME") is produced by the ring-opening polymerization. The PTME is mixed with an aliphatic alcohol including 1 to 4 carbon atoms in order to perform transesterification due to an alcoholysis reaction conducted in the presence of a transesterification catalyst. Hereby, polytetramethylene ether glycol (hereinafter, may be referred to as "PTMG") can be produced.

<Transesterification Catalyst>

Known catalysts used for hydrolysis or transesterification reaction in the related art may be used as a catalyst for transesterification. Commonly, an alkoxide of an alkali metal, such as lithium, sodium, potassium, cesium, or rubidium is used as a transesterification catalyst. In particular, an alkoxide of sodium or potassium is preferably used. Specific examples of the transesterification catalyst include sodium methoxide, sodium ethoxide, sodium isopropoxide, potassium methoxide, potassium ethoxide, and potassium isopropoxide. Sodium methoxide is more preferable because it is highly versatile and inexpensive.

<Reaction Conditions and Reaction Operation>

Commonly, the hydrolysis or transesterification reaction can be performed at normal or increased pressure. The reaction pressure is commonly 0.1 to 2.0 MPa and is preferably 1.0 to 1.5 MPa. The reaction temperature in the hydrolysis or transesterification reaction is commonly 60° C. to 180° C.

Examples of the method for removing the catalyst included in the reaction liquid produced by the hydrolysis or transesterification reaction include a method in which a treatment using an acidic ion-exchange resin is performed. The acidic ion-exchange resin is not limited but is preferably a strongly acidic ion-exchange resin including a sulfonic group. Specific examples of the acidic ion-exchange resin include cation-exchange resins SK1B-H, SK110-H, PK216-H, and PK220-H produced by Mitsubishi Chemical Corporation.

The concentration of polyalkylene ether glycols in the reaction liquid produced by the hydrolysis or transesterification reaction, which is subjected to the treatment using the acidic ion-exchange resin, is preferably 30% to 60% by weight. When the concentration of polyalkylene ether glycols is equal to or less than the upper limit, an excessive increase in viscosity can be avoided and, consequently, the rate at which the reaction liquid diffuses inside the ion-exchange resin when the catalyst is removed by the ion-exchange treatment can be increased. This enables the catalyst to be removed to a sufficient degree. When the concentration of polyalkylene ether glycols is equal to or more than the lower limit, a high product yield can be achieved. This increases the production efficiency.

Before the reaction liquid produced by the hydrolysis or transesterification reaction is treated with the acidic ion-exchange resin, water is added to the reaction liquid such that the water content in the reaction liquid is preferably set to 0.5% to 10% by weight and is more preferably set to 1% to 5% by weight. When the above water content is equal to or more than the lower limit, a sufficiently high effective ion-exchange capacity can be achieved and, as a result, the amount of the ion-exchange resin necessary for the above treatment can be reduced. When the water content is equal to or less than the upper limit, the load of collecting the solvent subsequent to the ion-exchange treatment can be reduced while the effective ion-exchange capacity and the product yield are maintained at certain levels.

The treatment using the acidic ion-exchange resin may be performed in either a batch mode or a flow mode with a fixed-bed apparatus. Performing the above treatment in the flow mode is easier and simpler than performing the treatment in a batch mode. The flow-mode treatment is commonly performed under the following conditions: LHSV (liquid hourly space velocity): 0.5 to 5 $hr^{-1}$ and temperature: 20° C. to 60° C.; preferably, LHSV: 1 to 3 $hr^{-1}$ and temperature: 25° C. to 40° C. When the LHSV is equal to or more than the lower limit, the treatment does not require a large amount of time. When the LHSV is equal to or less than the upper limit, a suitable ion exchange efficiency can be achieved. When the above temperature is equal to or more than the lower limit, a suitable ion exchange efficiency can be achieved. When the above temperature is equal to or less than the upper limit, the likelihood of reacting with the alcohol used for transesterification to form an ether is reduced.

In order to form the polyalkylene ether glycol produced by the above-described treatment into an intended composition, furthermore, a treatment using an evaporation separation device or an extraction operation, such as oil-water separation, may be performed. The evaporation separation device is not limited. Examples of preferable evaporation separation devices include a natural circulation evaporator, a forced circulation evaporator, and a mechanically agitated evaporator. Examples of the natural circulation evaporator include a short-tube vertical evaporator, a horizontal-tube evaporator, a long-tube vertical rising liquid film evaporator, and a long-tube vertical falling liquid film evaporator. Examples of the forced circulation evaporator include a multi-tube evaporator and a plate evaporator. Examples of the mechanically agitated evaporator include a centrifugal thin-film evaporator and an agitated thin-film evaporator. Among these, a mechanically agitated evaporator is preferable, and a mechanically agitated thin-film evaporator is particularly preferable. After evaporation separation has been performed using the above-described evaporation separation device, condensation is performed by cooling in order to collect an intended polyalkylene ether glycol composition.

Although the conditions under which the mechanically agitated thin-film evaporator is operated vary with the amount of the liquid that is to be treated, the pressure is commonly 10 to 1000 Pa and is preferably 50 to 500 Pa, the temperature is commonly 100° C. to 300° C. and is preferably 150° C. to 250° C., and the amount of the treatment time is commonly 0.1 to 10 minutes and is preferably 0.5 to 5 minutes.

In the oil-water separation method, a liquid mixture of the polyalkylene ether glycol composition, water, and at least one or more alcohols is used.

The alcohol needs to include one or more hydroxyl groups. Specific examples of such a compound include aliphatic alcohols, such as methanol, ethanol, propanol, isopropanol, hexanol, heptanol, octanol, nonanol, decanol, ethylhexanol, propylene glycol, and glycerin; and aromatic alcohols, such as salicyl alcohol and benzyl alcohol. The above alcohols may be used alone or in combination of two or more. Among these, alcohols including 1 to 10 carbon atoms are preferable, aliphatic alcohols including 1 to 10 carbon atoms are more preferable, and methanol, ethanol, propanol, isopropanol, and butanol are further preferable in consideration of solubility with the polyalkylene ether glycols and water. Methanol and ethanol are particularly preferably used in consideration of ease of handling and solubility with polyalkylene ether glycols.

The terminal alkoxy group PAEG and the dialkylene ether glycol included in the polyalkylene ether glycol composition according to the present invention may come to be included in the polyalkylene ether glycol composition in the process of production. In another case, terminal alkoxy group PAEG and dialkylene ether glycol may be produced separately and added to the polyalkylene ether glycol such that an intended composition is produced.

In other words, the terminal alkoxy group PAEG may be produced in the process of production of the polyalkylene ether glycol as a by-product from the polyalkylene ether glycol due to etherification with the alcohol used for transesterification. In the case where the amount of the terminal alkoxy group PAEG produced as a by-product is excessively large, it may be removed by the above-described composition adjustment operation in order to produce the polyalkylene ether glycol composition according to the present invention which includes the predetermined amount of the terminal alkoxy group PAEG. In the case where the amount of the terminal alkoxy group PAEG produced as a by-product is excessively small, terminal alkoxy group PAEG may be added. Similarly, the dialkylene ether glycol may be produced in the process of production of the polyalkylene ether glycol as a by-product due to etherification of dialkylene ether glycol with the alcohol used for transesterification. Thus, composition adjustment may be performed as for the terminal alkoxy group PAEG in order to produce the polyalkylene ether glycol composition according to the present invention.

[Polyurethane]

A polyurethane can be produced by addition polymerization of a raw material including the polyalkylene ether glycol composition according to the present invention, a compound including a plurality of isocyanate groups (hereinafter, this compound may be referred to as "polyisocyanate compound"), a chain extender that is a low-molecular-weight polyol preferably having a molecular weight of 50 to 300, and a high-molecular-weight polyol having a hydroxyl value of 200 or less, such as a polyalkylene ether glycol.

The polyurethane produced using the polyalkylene ether glycol composition according to the present invention is preferably a polyurethane elastomer (hereinafter, may be referred to as "polyurethane elastomer according to the present invention"). The polyurethane elastomer may be a polyurethane foam.

<Polyisocyanate Compound>

The polyisocyanate compound used as a raw material for producing the polyurethane elastomer according to the present invention may be any compound including two or more isocyanate groups. Examples thereof include various aliphatic, alicyclic, and aromatic polyisocyanate compounds known in the related art.

Examples of such polyisocyanate compounds include aliphatic diisocyanate compounds, such as tetramethylene diisocyanate, hexamethylene diisocyanate, 2,2,4-trimethylhexamethylene diisocyanate, 2,4,4-trimethylhexamethylene diisocyanate, lysine diisocyanate, and a dimer diisocyanate produced by transforming carboxyl groups of a dimer acid to isocyanate groups; alicyclic diisocyanate compounds, such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate, and 1,3-bis(isocyanatomethyl)cyclohexane; and aromatic diisocyanate compounds, such as xylylene diisocyanate, 4,4'-diphenyl diisocyanate, toluene diisocyanate (2,4-toluene diisocyanate, 2,6-toluene diisocyanate), m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylene polyphenyl isocyanate, phenylene diisocyanate, and m-tetramethylxylylene diisocyanate. The above polyisocyanate compounds may be used alone or in combination of two or more.

Among these, aromatic polyisocyanate compounds are preferable in consideration of reactivity with polyols and high curability of the resulting polyurethane elastomer. In particular, 4,4'-diphenylmethane diisocyanate (hereinafter, may be referred to as "MDI"), toluene diisocyanate (TDI), and xylylene diisocyanate are preferable because they are industrially available in large amounts at low costs.

<Chain Extender>

In the case where the prepolymer including an isocyanate group which is described below is produced, the chain extender used as a raw material for producing the polyurethane elastomer according to the present invention is selected from low-molecular-weight polyols including at least two active hydrogens capable of reacting with an isocyanate group. Among such polyols, a polyol having a molecular weight of 50 to 300 is preferable.

Specific examples thereof include linear diols, such as ethylene glycol, 1,3-propanediol, 1,4-butanediol, 1,5-pentanediol, 1,6-hexanediol, 1,8-octanediol, 1,9-nonanediol, 1,10-decanediol, and 1,12-dodecanediol; branched diols, such as 2-methyl-1,3-propanediol, 2,2-dimethyl-1,3-propanediol, 2,2-diethyl-1,3-propanediol, 2-methyl-2-propyl-1,3-propanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol, and a dimer diol; diols including an ether group, such as diethylene glycol and dipropylene glycol; diols including an alicyclic structure, such as 1,4-cyclohexanediol, 1,4-cyclohexanedimethanol, and 1,4-dihydroxyethylcyclohexane; diols including an aromatic group, such as xylylene glycol, 1,4-dihydroxyethylbenzene, and 4,4'-methylenebis(hydroxyethylbenzene); and polyols, such as glycerin, trimethylolpropane, and pentaerythritol. The above chain extenders may be used alone or in combination of two or more.

Among these, 1,4-butanediol, 1,5-pentanediol, and 1,6-hexanediol are preferable because they are excellent in terms of phase separation between the soft and hard segments of the resulting polyurethane elastomer, thereby enhance flexibility and elastic recoverability, and are industrially available in large amounts at low costs.

<High-Molecular-Weight Polyol>

The high-molecular-weight polyol is not limited and may be any high-molecular-weight polyol commonly used for producing a polyurethane. Examples thereof include a polyether polyol, a polyester polyol, a polycaprolactone polyol, and a polycarbonate polyol.

Among these, a polyalkylene ether glycol having a hydroxyl value of 200 or less, such as a polyalkylene ether glycol having a hydroxyl value of 37 to 175, is preferable. The above polyalkylene ether glycol preferably has the same structural unit as the polyalkylene ether glycols included in the polyalkylene ether glycol composition according to the present invention.

The above high-molecular-weight polyols may be used alone or in combination of two or more.

The molar ratio of the high-molecular-weight polyol used to the polyalkylene ether glycols included in the polyalkylene ether glycol composition according to the present invention is preferably 0.1 or more, is more preferably 0.5 or more, and is further preferably 1 or more; and is preferably 50 or less, is more preferably 30 or less, and is further preferably 20 or less. When the above molar ratio falls within the above range, the compatibility of the polyalkylene ether glycol composition with the low-molecular-weight polyol used as a chain extender may be increased.

[Method for Producing Polyurethane Elastomer]

For producing the polyurethane elastomer according to the present invention, various experimental and industrial production methods commonly used in the related art may be used. Examples thereof include the methods 1) and 2) below.

1) A method in which the polyalkylene ether glycol composition according to the present invention, the high-molecular-weight polyol, the polyisocyanate compound, and the chain extender that is a low-molecular-weight polyol are mixed and reacted with one another at a time (hereinafter, this method may be referred to as "one-step method").

2) A method in which the polyalkylene ether glycol composition according to the present invention, the high-molecular-weight polyol, and the polyisocyanate compound are reacted with one another in order to prepare a prepolymer including two isocyanate groups at respective terminals and the prepolymer is subsequently reacted with the chain extender that is a low-molecular-weight polyol (hereinafter, this method may be referred to as "isocyanate group terminal two-step method"), or a method in which the polyalkylene ether glycol composition according to the present invention, the high-molecular-weight polyol, and the polyisocyanate compound are reacted with one another in order to prepare a prepolymer including two hydroxyl groups at respective terminals and the prepolymer is subsequently reacted with a chain extender that is a polyisocyanate compound (hereinafter, this method may be referred to as "hydroxyl group terminal two-step method")(hereinafter, the above methods may be referred to collectively as "two-step method").

Among these, the isocyanate group terminal two-step method includes a step of reacting the polyalkylene ether glycol composition according to the present invention and the high-molecular-weight polyol with one equivalent or more of the polyisocyanate compound to prepare a prepolymer including two isocyanate groups at the respective terminals, which is a part of a polyurethane which corresponds to the soft segment, as an intermediate. When the above prepolymer is prepared first and subsequently reacted with the chain extender that is a low-molecular-weight polyol, the molecular weight of the soft segment portion may be readily adjusted. The two-step method is useful in the case where the phase separation between the soft and hard segments needs to be performed with certainty.

<One-Step Method>

The one-step method, which is referred to also as "one-shot method", is a method in which the polyalkylene ether glycol composition according to the present invention, the high-molecular-weight polyol, the polyisocyanate compound, and the chain extender that is a low-molecular-weight polyol are charged at a time to cause a reaction.

Although the amount of the polyisocyanate compound used in the one-step method is not limited, when the total of the total number of hydroxyl groups included in the polyalkylene ether glycol composition according to the present invention and the high-molecular-weight polyol and the number of hydroxyl groups included in the chain extender that is a low-molecular-weight polyol is defined as 1 equivalent, the lower limit for the amount of the polyisocyanate compound used is preferably 0.7 equivalents, is more preferably 0.8 equivalents, is further preferably 0.9 equivalents, and is particularly preferably 0.95 equivalents, and the upper limit for the above amount is preferably 3.0 equivalents, is more preferably 2.0 equivalents, is further preferably 1.5 equivalents, and is particularly preferably 1.1 equivalents.

Setting the amount of the polyisocyanate compound used to be equal to or less than the upper limit avoids a side reaction of unreacted isocyanate groups and consequently prevents an excessive increase in the viscosity of the resulting polyurethane elastomer and a reduction in ease of handling and degradation of flexibility. When the amount of the polyisocyanate compound used is equal to or more than the lower limit, the resulting polyurethane elastomer may have a sufficiently high molecular weight and a sufficiently high strength.

The amount of the chain extender that is a low-molecular-weight polyol used is not limited. When the number of isocyanate groups included in the polyisocyanate compound subtracted by the total number of hydroxyl groups included in the polyalkylene ether glycol composition according to the present invention and the high-molecular-weight polyol is defined as 1 equivalent, the lower limit for the amount of the chain extender that is a low-molecular-weight polyol used is preferably 0.7 equivalents, is more preferably 0.8 equivalents, is further preferably 0.9 equivalents, and is particularly preferably 0.95 equivalents, and the upper limit for the above amount is preferably 3.0 equivalents, is more preferably 2.0 equivalents, is further preferably 1.5 equivalents, and is particularly preferably 1.1 equivalents. When the amount of the chain extender that is a low-molecular-weight polyol used is equal to or less than the upper limit, the resulting polyurethane elastomer may be readily soluble in solvents and workability may be increased. When the amount of the chain extender that is a low-molecular-weight polyol used is equal to or more than the lower limit, the hardness of the resulting polyurethane elastomer is not reduced to an excessive degree and the polyurethane elastomer is likely to have sufficient degrees of strength, hardness, elastic recoverability, and elasticity retention capacity. In addition, the polyurethane elastomer has suitable heat resistance.

<Two-Step Method>

Common examples of the two-step method, which is referred to also as "prepolymer method", include the following methods.

(a) A certain amount of the polyalkylene ether glycol composition according to the present invention, a certain amount of the high-molecular-weight polyol, and an excessive amount of the polyisocyanate compound are reacted with one another such that the reaction equivalent ratio of Polyisocyanate compound/(Polyalkylene ether glycol composition according to the present invention and the other polyols) is more than 1 and 10.0 or less in order to produce a prepolymer including isocyanate groups at the respective terminals of the molecular chain. Subsequently, the prepolymer is reacted with the chain extender that is a low-molecular-weight polyol to produce a polyurethane elastomer.

(b) A certain amount of the polyisocyanate compound and excessive amounts of the polyalkylene ether glycol composition according to the present invention and the high-molecular-weight polyol are reacted with one another such that the reaction equivalent ratio of Polyisocyanate compound/(Polyalkylene ether glycol composition according to the present invention and the other polyols) is 0.1 or more and less than 1.0 to produce a prepolymer including hydroxyl groups at the respective terminals of the molecular chain. Subsequently, the prepolymer is reacted with a chain extender that is a polyisocyanate compound including isocyanate groups at the respective terminals to produce a polyurethane elastomer.

The two-step method can be conducted without using a solvent or in the presence of a solvent.

Production of the polyurethane elastomer by the two-step method (a) can be achieved by any one of the methods (1) to (3) below.

(1) Without using a solvent, the polyisocyanate compound, the polyalkylene ether glycol composition according to the present invention, and the high-molecular-weight polyol are reacted with one another directly in order to synthesis a prepolymer, which is directly used for the chain extension reaction using a low-molecular-weight polyol.

(2) A prepolymer is synthesized by the method (1) and subsequently dissolved in a solvent. The resulting solution is used for the subsequent chain extension reaction using a low-molecular-weight polyol.

(3) Using a solvent, the polyisocyanate compound, the polyalkylene ether glycol composition according to the present invention, and the high-molecular-weight polyol are reacted with one another. Subsequently, the chain extension reaction using a low-molecular-weight polyol is conducted.

In the case where the method (1) is used, it is important to produce the polyurethane elastomer in coexistence with a solvent by, for example, dissolving the chain extender that is a low-molecular-weight polyol in a solvent or by dissolving the prepolymer and the chain extender that is a low-molecular-weight polyol in a solvent simultaneously, prior to the chain extension reaction.

The amount of the polyisocyanate compound used in the two-step method (a) is not limited. When the total number of all the hydroxyl groups included in the polyalkylene ether glycol composition according to the present invention and the high-molecular-weight polyol is defined as 1 equivalent, the lower limit for the number of isocyanate groups is preferably more than 1.0 equivalents, is more preferably 1.2 equivalents, and is further preferably 1.5 equivalents, and the upper limit for the number of isocyanate groups is preferably 10.0 equivalents, is more preferably 5.0 equivalents, and is further preferably 3.0 equivalents.

When the amount of the polyisocyanate compound used is equal to or less than the upper limit, the side reaction caused by excess isocyanate groups is suppressed and, consequently, intended physical properties of the polyurethane elastomer may be achieved. When the amount of the polyisocyanate compound used is equal to or more than the lower limit, the resulting polyurethane elastomer has a sufficiently high molecular weight, a suitable strength, and suitable thermal stability.

The amount of the chain extender that is a low-molecular-weight polyol used is not limited. When the number of isocyanate groups included in the prepolymer is defined as 1 equivalent, the lower limit for the amount of the above chain extender is preferably 0.1 equivalents, is more preferably 0.5 equivalents, and is further preferably 0.8 equivalents, and the upper limit for the amount of the above chain extender is preferably 5.0 equivalents, is more preferably 3.0 equivalents, and is further preferably 2.0 equivalents.

In the chain extension reaction, a monofunctional organic amine or alcohol may be used in a coexistent manner in order to adjust molecular weight.

The amount of the polyisocyanate compound used when the prepolymer including hydroxyl groups at the respective terminals is prepared by the two-step method (b) is not limited. When the total number of all the hydroxyl groups included in the polyalkylene ether glycol composition according to the present invention and the high-molecular-weight polyol is defined as 1 equivalent, the lower limit for the number of isocyanate groups is preferably 0.1 equivalents, is more preferably 0.5 equivalents, and is further preferably 0.7 equivalents, and the upper limit for the number of isocyanate groups is preferably 0.99 equivalents, is more preferably 0.98 equivalents, and is further preferably 0.97 equivalents.

Setting the amount of the polyisocyanate compound used to be equal to or more than the lower limit prevents an excessive increase in the amount of time required for conducting the subsequent chain extension reaction until an intended molecular weight is achieved and consequently increases the production efficiency. Setting the amount of the polyisocyanate compound used to be equal to or less than the upper limit prevents an excessive increase in viscosity and thereby limits reductions in the flexibility, ease of handling, and productivity of the resulting polyurethane elastomer.

The amount of the chain extender that is a polyisocyanate compound including isocyanate groups at the respective terminals is not limited. When the total number of all the hydroxyl groups included in the polyalkylene ether glycol composition according to the present invention and the high-molecular-weight polyol that are used for producing the prepolymer is defined as 1 equivalent, the lower limit for the total equivalent including the isocyanate groups used for preparing the prepolymer is preferably 0.7 equivalents, is more preferably 0.8 equivalents, and is further preferably 0.9 equivalents, and the upper limit for the above total equivalent is preferably less than 1.0 equivalents, is more preferably 0.99 equivalents, and is further preferably 0.98 equivalents.

In the chain extension reaction, a monofunctional organic amine or alcohol may be used in a coexistent manner in order to adjust molecular weight.

The chain extension reaction is commonly conducted at 0° C. to 250° C. The temperature at which the chain extension reaction is conducted is not limited and varies depending on the amount of the solvent used, the reactivity of the raw material used, the facility used for conducting the reaction, and the like. If the chain extension reaction is conducted at an excessively low temperature, the reaction rate may be reduced and the amount of time required by production may be increased due to low solubility of raw materials and polymers. If the chain extension reaction is conducted at an excessively high temperature, a side reaction and the decomposition of the resulting polyurethane may occur. The chain extension reaction may be conducted at reduced pressure while degassing is performed.

In the chain extension reaction, a catalyst, a stabilizer, and the like may be used as needed.

Examples of the catalyst include the following compounds: triethylamine, tributylamine, dibutyltin dilaurate, stannous octoate, acetic acid, phosphoric acid, sulfuric acid, hydrochloric acid, and sulfonic acid. The above catalysts may be used alone or in combination of two or more.

Examples of the stabilizer include the following compounds: 2,6-dibutyl-4-methylphenol, distearyl thiodipropionate, N,N'-di-2-naphthyl-1,4-phenylenediamine, and tris (dinonylphenyl) phosphite. The above stabilizers may be used alone or in combination of two or more.

In the case where a chain extender having high reactivity, such as a short-chain aliphatic amine, is used, the chain extension reaction may be conducted without using a catalyst.

Optionally, a reaction inhibitor, such as tris(2-ethylhexyl) phosphite, may be used.

<Additive>

Various additives, such as a heat stabilizer, a light stabilizer, a colorant, a filler, a stabilizer, an ultraviolet absorber, an antioxidant, an antitack agent, a flame retardant, an antioxidant, and an inorganic filler, may be added to and mixed with the polyurethane elastomer produced using the polyalkylene ether glycol composition according to the present invention (hereinafter, this polyurethane elastomer may be referred to as "polyurethane elastomer according to the present invention") such that the properties of the polyurethane elastomer according to the present invention are not impaired.

Examples of compounds that can be used as a heat stabilizer include phosphorus compounds, such as aliphatic, aromatic, and alkyl group-substituted aromatic esters of phosphoric acid and phosphorous acid, a hypophosphorous acid derivative, phenylphosphonic acid, phenylphosphinic acid, diphenylphosphonic acid, polyphosphonate, dialkyl pentaerythritol diphosphite, and dialkyl bisphenol A diphosphite; phenol derivatives and, in particular, hindered phenolic compounds; sulfur-containing compounds, such as a thioether, a dithioate salt, a mercaptobenzimidazole, a thiocarbanilide, and a thiodipropionate ester; and tin compounds, such as tin maleate and dibutyltin monoxide.

Specific examples of the hindered phenolic compounds include "Irganox1010" (product name: produced by BASF Japan), "Irganox1520" (product name: produced by BASF Japan), and "Irganox245" (product name: produced by BASF Japan).

Examples of the phosphorus compounds include "PEP-36", "PEP-24G", and "HP-10" (the above are all product names: produced by ADEKA CORPORATION) and "Irgafos 168" (product name: produced by BASF Japan).

Specific examples of the sulfur-containing compounds include thioether compounds, such as dilauryl thiopropionate (DLTP) and distearyl thiopropionate (DSTP).

Examples of the light stabilizer include benzotriazole compounds and benzophenone compounds. Specific examples thereof include "TINUVIN622LD" and "TINUVIN765" (the above are produced by Ciba Specialty Chemicals); and "SANOL LS-2626" and "SANOL LS-765" (the above are produced by Sankyo Co., Ltd.).

Examples of the ultraviolet absorber include "TINUVIN328" and "TINUVIN234" (the above are produced by Ciba Specialty Chemicals).

Examples of the colorant include dyes, such as a direct dye, an acidic dye, a basic dye, and a metal-complex dye; inorganic pigments, such as carbon black, titanium oxide, zinc oxide, iron oxide, and mica; and organic pigments, such as a coupling azo pigment, a condensed azo pigment, an anthraquinone pigment, a thioindigo pigment, a dioxazone pigment, and a phthalocyanine pigment.

Examples of the inorganic filler include short glass fibers, carbon fibers, alumina, talc, graphite, melamine, and white clay.

Examples of the flame retardant include addition of phosphorus- or halogen-containing organic compounds, a bromine- or chlorine-containing organic compound, ammonium polyphosphate, aluminum hydroxide, and antimony oxide and a reaction-type flame retardant.

The above additives may be used alone, or any two or more of the above additives may be used in combination at any ratio.

The lower limit for the weight ratio of the additives used to the polyurethane elastomer is preferably 0.01% by weight, is more preferably 0.05% by weight, and is further preferably 0.1% by weight, and the upper limit for the above weight ratio is preferably 10% by weight, is more preferably 5% by weight, and is further preferably 1% by weight. When the amount of the additives used is equal to or more than the lower limit, the advantageous effects of addition of the additives can be achieved to a sufficient degree. When the amount of the additives used is equal to or less than the upper limit, the risk of the additives precipitating in the polyurethane elastomer or making the polyurethane elastomer cloudy can be eliminated.

<Molecular Weight>

The molecular weight of the polyurethane elastomer according to the present invention is not limited and may be adjusted appropriately in accordance with the application. The weight-average molecular weight (Mw) of the polyurethane elastomer according to the present invention which is determined by GPC in terms of polystyrene equivalent weight is preferably 50,000 or more and is more preferably 100,000 or more; and is preferably 500,000 or less and is more preferably 300,000 or less. When the Mw is equal to or more than the lower limit, a sufficiently high strength and sufficiently high hardness can be achieved. When the Mw is equal to or less than the upper limit, ease of handling, such as workability, can be increased.

<Applications>

Since the polyurethane elastomer according to the present invention is excellent in terms of flexibility and durability and has suitable heat resistance, suitable abrasion resistance, and excellent workability, it can be used in various applications.

For example, the polyurethane elastomer according to the present invention can be used as a cast polyurethane elastomer. Specific examples of the application thereof include rollers, such as a reduction roller, a papermaking roller, a paper feed roller for copying machines, and a pretensioning roller; and solid tires and casters for forklifts, automobiles, Newtram, flatcars, trucks, and the like. Specific examples of the application also include the following industrial products: a conveyer belt idler, a guide roller, a pulley, a steel pipe liner, a rubber screen for ores, a gear, a connection ring, a liner, a pump impeller, a cyclone corn, and a cyclone liner. The polyurethane elastomer according to the present invention may also be used for producing a belt for office automation equipment, a paper feed roller, a cleaning blade for copying machines, a snowplow, a toothed belt, a surf roller, and the like.

The polyurethane elastomer according to the present invention may also be used as a thermoplastic elastomer (hereinafter, may be referred to as "thermoplastic polyurethane elastomer according to the present invention"). A molded article having excellent stretchability can be produced by molding the thermoplastic polyurethane elastomer according to the present invention. The method for molding the thermoplastic polyurethane elastomer according to the present invention is not limited; various molding methods commonly used for molding thermoplastic polymers may be used. Any molding method, such as injection molding, extrusion molding, press molding, blow molding, calendar molding, casting, or rolling, may be used. Molded articles having various shapes, such as a resin plate, a film, a sheet, a tube, a hose, a belt, a roller, a synthetic leather, a shoe sole, an automotive component, an escalator handrail, a road sign member, and fibers, can be produced by molding the thermoplastic polyurethane elastomer according to the present invention.

Specific examples of application of the thermoplastic polyurethane elastomer according to the present invention include the following:

tubes and hoses included in a pneumatic component used in the fields of food and medicine, a coating apparatus, an analytical instrument, a physical and chemical appliance, a metering pump, a water treatment instrument, an industrial robot, and the like, a spiral tube, and a fire hose;

belts, such as a round belt, a V-belt, and a flat belt, included in various driving mechanisms, spinning machinery, a packing machine, a printing machine, and the like;

a shoe heel top, a shoe sole, machine components, such as a coupling, a packing, a pole joint, a bushing, a gear, and a roller, sporting and leisure goods, and a watch strap;

automotive components, such as an oil stopper, a gear box, a spacer, a chassis component, an interior part, and a tire chain alternative; and films, such as a keyboard film and an automotive film, a curl cord, a cable sheath, bellows, a transport belt, a flexible container, a binder, a synthetic leather, a dipping product, and an adhesive.

The polyurethane elastomer according to the present invention may be formed into a foamed polyurethane elastomer or a polyurethane foam. Examples of the method for forming the polyurethane elastomer into a foamed polyurethane elastomer or a polyurethane foam include chemical foaming using water or the like and mechanical foaming, such as mechanical flossing. Other examples thereof include a rigid foam produced by spray foaming, slab foaming, injection foaming, or mold foaming and a flexible foam produced by slab foaming or mold foaming.

Specific examples of application of the foamed polyurethane elastomer or the polyurethane foam include thermal insulators and isolators for electronic devices and buildings, automotive seats, automotive ceiling cushions, beddings, such as a mattress, insoles, midsoles, and shoe soles.

EXAMPLES

The present invention is specifically described with reference to Examples and Comparative Examples below. The present invention is not limited by Examples below without departing from the scope of the invention.

{Evaluation Method}

The methods for evaluating polyalkylene ether glycols and polyalkylene ether glycol compositions prepared in Examples and Comparative Examples below are as follows.

<Hydroxyl Value>

The hydroxyl value of a polyalkylene ether glycol or polyalkylene ether glycol composition was measured in accordance with JIS K1557-1 by a method in which an acetylating reagent was used.

<Method for Determining Amount of Polyalkylene Ether Glycol (Including Dialkylene Ether Glycol)>

After tridecane had been added to a sample as an internal standard, an analysis was conducted by gas chromatography in order to determine the number of hydroxyl group terminals.

The GC apparatus used was GC-14A produced by Shimadzu Corporation. The column used was a nonpolar column "DB-1" produced by Agilent Technologies, Inc.

<Method for Determining Amount of Terminal Alkoxy Group PAEG>

A sample was dissolved in $CDCl_3$, and 400-MHz $^1$H-NMR (AL-400 produced by JEOL Ltd.) was subsequently measured. The amount of the terminal alkoxy group PAEG was determined on the basis of the positions of signals of the components in order to determine the number of alkoxy group terminals.

{Production and Evaluation of Polyalkylene Ether Glycol Composition}

Example 1

<Preparation of Polytetramethylene Ether Glycol Composition>

With 50 parts by weight of polytetramethylene ether glycol which did not include dibutylene ether glycol and had a hydroxyl value of 280, 50 parts by weight of methanol was mixed. The resulting mixture was continuously passed through a cation-exchange resin "PK216L-H" (produced by Mitsubishi Chemical Corporation) having an inside temperature maintained at 60° C. with a residence time of 10 hours. Hereby, a mixture of 50 parts by weight of polytetramethylene ether glycol that did not include dibutylene ether glycol and had a number of methoxy group terminals of 1.0 mmol/g and 50 parts by weight of methanol was prepared. Subsequently, methanol was removed by simple distillation.

The polytetramethylene ether glycol that did not include dibutylene ether glycol and had a number of methoxy group terminals of 1.0 mmol/g was mixed with polytetramethylene ether glycol that did not include methoxy group terminals and had a hydroxyl value of 280 and dibutylene ether glycol to prepare a polytetramethylene ether glycol composition.

The hydroxyl value (PAEG composition hydroxyl value), PAEG hydroxyl group terminal number, DAEG hydroxyl group terminal number, and PAEG alkoxy group terminal number (number of methoxy group terminals) of the polytetramethylene ether glycol composition were analyzed. On the basis of the results of the above analysis, the ratio of PAEG methoxy group terminal number/PAEG hydroxyl group terminal number and the ratio of PAEG methoxy group terminal number/DAEG hydroxyl group terminal number were calculated. Table 1 lists the results.

<Evaluation of Preservation of Mixture With 1,4-Butanediol>

The polytetramethylene ether glycol composition and 1,4-butanediol were mixed with each other at a weight ratio of 1:3. The resulting mixture was charged into a transparent sample bottle. The content of the bottle which was visually inspected when the mixture was charged into the bottle was a uniform colorless transparent liquid. The sample bottle was stored in a freezer maintained at −10° C. for 16 hours and then removed from the freezer. When the content of the sample bottle removed from the freezer was visually inspected, the precipitation of a negligible amount of the solid matter was confirmed.

Example 2

<Preparation of Polytetramethylene Ether Glycol Composition>

As in Example 1, the polytetramethylene ether glycol that did not include dibutylene ether glycol and had a number of methoxy group terminals of 1.0 mmol/g was mixed with polytetramethylene ether glycol that did not include methoxy group terminals and had a hydroxyl value of 280 and dibutylene ether glycol to prepare a polytetramethylene ether glycol composition. In Example 2, the mixing ratio of the polytetramethylene ether glycol having a hydroxyl value of 280 was higher than in Example 1.

The hydroxyl value (PAEG composition hydroxyl value), PAEG hydroxyl group terminal number, DAEG hydroxyl group terminal number, and PAEG alkoxy group terminal number (number of methoxy group terminals) of the polytetramethylene ether glycol composition were analyzed. On the basis of the results of the above analysis, the ratio of PAEG methoxy group terminal number/PAEG hydroxyl group terminal number and the ratio of PAEG methoxy group terminal number/DAEG hydroxyl group terminal number were calculated. Table 1 lists the results.

<Evaluation of Preservation of Mixture With 1,4-Butanediol>

A preservation evaluation was made as in Example 1. In the visual evaluation made when the mixture was charged into the sample bottle, a uniform colorless transparent liquid was confirmed. In the visual evaluation made after the mixture had been maintained at low temperatures, the precipitation of a trace amount of solid matter was confirmed.

Comparative Example 1

<Preparation of Polytetramethylene Ether Glycol Composition>

As in Example 1, the polytetramethylene ether glycol that did not include dibutylene ether glycol and had a number of methoxy group terminals of 1.0 mmol/g was mixed with polytetramethylene ether glycol that did not include methoxy group terminals and had a hydroxyl value of 280 and dibutylene ether glycol to prepare a polytetramethylene ether glycol composition. In Comparative Example 1, the mixing ratio of the polytetramethylene glycol having a hydroxyl value of 280 was lower than in Example 1.

The hydroxyl value (PAEG composition hydroxyl value), PAEG hydroxyl group terminal number, DAEG hydroxyl group terminal number, and PAEG alkoxy group terminal number (number of methoxy group terminals) of the polytetramethylene ether glycol composition were analyzed. On the basis of the results of the above analysis, the ratio of PAEG methoxy group terminal number/PAEG hydroxyl group terminal number and the ratio of PAEG methoxy group terminal number/DAEG hydroxyl group terminal number were calculated. Table 1 lists the results.

<Evaluation of Preservation of Mixture With 1,4-Butanediol>

A preservation evaluation was made as in Example 1. In the visual evaluation made when the mixture was charged into the sample bottle, a uniform colorless transparent liquid was confirmed. In the visual evaluation made after the mixture had been maintained at low temperatures, the precipitation of a large amount of solid matter was confirmed.

Comparative Example 2

<Preparation of Polytetramethylene Ether Glycol Composition>

As in Example 1, the polytetramethylene ether glycol that did not include dibutylene ether glycol and had a number of methoxy group terminals of 1.0 mmol/g was mixed with polytetramethylene ether glycol that did not include methoxy group terminals and had a hydroxyl value of 280 and dibutylene ether glycol to prepare a polytetramethylene ether glycol composition. In Comparative Example 2, the mixing ratio of the polytetramethylene glycol having a hydroxyl value of 280 was lower than in Example 1.

The hydroxyl value (PAEG composition hydroxyl value), PAEG hydroxyl group terminal number, DAEG hydroxyl group terminal number, and PAEG alkoxy group terminal number (number of methoxy group terminals) of the polytetramethylene ether glycol composition were analyzed. On the basis of the results of the above analysis, the ratio of PAEG methoxy group terminal number/PAEG hydroxyl group terminal number and the ratio of PAEG methoxy group terminal number/DAEG hydroxyl group terminal number were calculated. Table 1 lists the results.

<Evaluation of Preservation of Mixture With 1,4-Butanediol>

A preservation evaluation was made as in Example 1. In the visual evaluation made when the mixture was charged into the sample bottle, a uniform colorless transparent liquid was confirmed. In the visual evaluation made after the mixture had been maintained at low temperatures, the precipitation of a significantly large amount of solid matter was confirmed.

Comparative Example 3

<Preparation of Polytetramethylene Ether Glycol Composition>

Polytetramethylene ether glycol having a hydroxyl value of 173 was mixed with dibutylene ether glycol to prepare a polytetramethylene ether glycol composition.

<Evaluation of Preservation of Mixture With 1,4-Butanediol>

A preservation evaluation was made as in Example 1. In the visual evaluation made when the mixture was charged into the sample bottle, a nonuniform colorless suspension was confirmed. In the visual evaluation made after the mixture had been maintained at low temperatures, the precipitation of a significantly large amount of solid matter was confirmed.

Table 1 summarizes the results.

In Table 1, the following abbreviations are used.

1,4BG: 1,4-Butanediol
PAEG: Polyalkylene ether glycol
DAEG: Dialkylene ether glycol

TABLE 1

|  | PAEG composition hydroxyl value | PAEG hydroxyl group terminal number (mmol/g) | DAEG hydroxyl group terminal number (mmol/g) | PAEG methoxy group terminal number (mmol/g) | PAEG methoxy group terminal number/PAEG hydroxyl group terminal number | PAEG methoxy group terminal number/DAEG hydroxyl group terminal number | Evaluation of preservation with 1,4BG | |
|---|---|---|---|---|---|---|---|---|
|  |  |  |  |  |  |  | Normal temperature | Low temperature (−10° C.) |
| Example 1 | 613 | 21.9 | 6.9 | 0.013 | 0.00059 | 0.0019 | Colorless, transparent | Trace amount of solid matter |
| Example 2 | 479 | 17.1 | 3.2 | 0.043 | 0.00251 | 0.0134 | Colorless, transparent | Trace amount of solid matter |
| Comparative Example 1 | 552 | 18.6 | 6.3 | 0.267 | 0.01435 | 0.0424 | Colorless, transparent | Large amount of solid matter |
| Comparative Example 2 | 521 | 18.6 | 3.1 | 0.99 | 0.05323 | 0.3194 | Colorless, transparent | Significantly large amount of solid matter |
| Comparative Example 3 | 495 | 17.5 | 0.18 | <0.0001 | <0.000006 | <0.00004 | Suspended | Significantly large amount of solid matter |

Since the polytetramethylene ether glycol compositions prepared in Comparative Examples 1 to 3 have poor compatibility with 1,4-butanediol, which is a low-molecular-weight polyol used as a raw material for producing a polyurethane and reduce the reaction uniformity in the production of a polyurethane, the physical properties of the resulting polyurethane may be degraded.

In contrast, since the polytetramethylene ether glycol compositions prepared in Examples 1 and 2 have suitable compatibility with 1,4-butanediol, which is a low-molecular-weight polyol used as a raw material for producing a polyurethane, they may increase the reaction uniformity in the production of a polyurethane and enhance the physical properties of the resulting polyurethane.

{Production and Evaluation of Polyurethane}
<Production of Polyurethane>

A polyurethane was produced using the polytetramethylene ether glycol composition (hydroxyl value: 613) prepared in Example 1 as a raw material in the following manner.

A separable flask equipped with a thermocouple, a cooling tube, and a stirrer was placed above an oil bath having a temperature of 60° C. Into the flask, 9.7 g of the polytetramethylene ether glycol composition prepared in Example 1, which had been heated to 80° C., 59.3 g of PTMG (product name: "PTMG2000", hydroxyl value: 53) produced by Mitsubishi Chemical Corporation, 6.33 g of 1,4-butanediol, and 239.00 g of dehydrated N,N-dimethylformamide (produced by Wako Pure Chemical Industries, Ltd.) were charged. Subsequently, 27.01 g of 4,4'-diphenylmethane diisocyanate (hereinafter, may be abbreviated as "MDI") was added to the flask. Then, the temperature was increased to 70° C. over about 1 hour while the inside of the separable flask was stirred at 60 rpm in a nitrogen atmosphere. After the temperature had reached 70° C., 0.017 g of a urethanizing catalyst "NEOSTANN U-830" (produced by Nitto Kasei Co., Ltd.) was added to the flask. Then, stirring was performed at 70° C. for another 2 hours. Subsequently, MDI was added to the flask in fractional amounts in order to adjust molecular weight. Hereby, a solution (solid content concentration: 30 weight %) of a polyurethane having a molecular weight of 180,000 (hereinafter, this polyurethane may be referred to as "PU1") was prepared.

For reference purposes, a solution of a polyurethane having a molecular weight of 180,000 (hereinafter, this polyurethane may be referred to as "PU2") was prepared as in the production of PU1, except that 69 g of PTMG (product name: "PTMG1000", hydroxyl value: 112) produced by Mitsubishi Chemical Corporation was used instead of 9.7 g of the polytetramethylene ether glycol composition prepared in Example 1 and 59.3 g of PTMG (product name: "PTMG2000", hydroxyl value: 53) produced by Mitsubishi Chemical Corporation, which were used as raw materials for the PU1.

[Evaluations of Polyurethane]
<Production of Polyurethane Specimen>

The polyurethane solution of PU1 or PU2 was applied to a fluororesin sheet (fluorine tape "NITOFLON 900" produced by Nitto Denko Corporation, thickness: 0.1 mm) with a 500-μm applicator. Then, drying was performed at normal pressure and 50° C. for 5 hours, at normal pressure and 100° C. for 0.5 hours, in vacuum at 100° C. for 0.5 hours, and in vacuum at 80° C. for 15 hours, in this order. Hereby, a specimen of a polyurethane film (thickness: about 50 μm) was prepared.

<Solvent Resistance>

A 3 cm×3 cm specimen was taken from the polyurethane film and charged into a glass laboratory dish having an inside diameter of 10 cm which contained 50 mL of a specific one of the following test solvents. After the specimen had been immersed in the test solvent at the specific temperature for the specific amount of time described below, the weight of the specimen was measured. A change (%) in weight between the specimen before immersion and the specimen after immersion (={(Weight of specimen after immersion−Weight of specimen before immersion)/Weight of specimen before immersion}×100) was calculated. The closer to 0% the weight change, the higher the solvent resistance.

Resistance to oleic acid: the specimen was immersed in oleic acid at 80° C. for 16 hours.

Resistance to ethanol: the specimen was immersed in ethanol at room temperature for 1 hour.

Resistance to ethyl acetate: the specimen was immersed in ethyl acetate at room temperature for 1 hour.

<Room-Temperature Tensile Test>

A specimen taken from the above polyurethane film (thickness: about 50 μm) which had a strip-like shape with a width of 10 mm and a length of 100 mm was subjected to a tensile test using a tensile testing machine (product name: "TENSILON UTM-III-100" produced by ORIENTEC CORPORATION) at a chuck-to-chuck distance of 50 mm, a test speed of 500 mm/min, a temperature of 23° C., and a relative humidity of 60% in accordance with JIS K6301. The elongation (rupture elongation) and stress (rupture strength) at which the specimen had ruptured were measured.

Table 2 lists the results of evaluations of the physical properties of PU1 and PU2.

TABLE 2

| | Specimen | Solvent resistance (weight change (%)) | | | Normal-temperature tensile test | |
| | | Oleic acid | Ethanol | Ethyl acetate | Fracture strength (MPa) | Rupture elongation (%) |
|---|---|---|---|---|---|---|
| Example | PU1 | 50.7 | 20.4 | 41.7 | 56 | 632 |
| Reference Example | PU2 | 49.6 | 26.0 | 75.2 | 46 | 450 |

It is clear from the results listed in Table 2 that the polyurethane (PU1) produced using the polyalkylene ether glycol composition according to the present invention as a raw material for producing a polyurethane had higher solvent resistance and a higher mechanical strength than the polyurethane (PU2) known in the related art.

Although the present invention has been described in detail with reference to particular embodiments, it is apparent to a person skilled in the art that various modifications can be made therein without departing from the spirit and scope of the present invention.

The present application is based on Japanese Patent Application No. 2019-063409 filed on Mar. 28, 2019, which is incorporated herein by reference in its entirety.

The invention claimed is:

1. A polyalkylene ether glycol composition comprising a polyalkylene ether glycol including an alkoxy group serving as a terminal group,
wherein the polyalkylene ether glycol composition has a hydroxyl value of 220 or more and 750 or less, and
wherein a ratio of the number of alkoxy group terminals of the polyalkylene ether glycol including an alkoxy group serving as a terminal group, the polyalkylene ether glycol being included in the polyalkylene ether glycol composition, to the number of hydroxyl group terminals of polyalkylene ether glycols included in the polyalkylene ether glycol composition is 0.00001 or more and 0.0040 or less.

2. The polyalkylene ether glycol composition according to claim 1, wherein the polyalkylene ether glycol composition includes a dialkylene ether glycol, and a ratio of the number of the alkoxy group terminals of the polyalkylene ether glycol including an alkoxy group serving as a terminal group, the polyalkylene ether glycol being included in the polyalkylene ether glycol composition, to the number of hydroxyl group terminals of the dialkylene ether glycol is 0.0001 or more and 0.025 or less.

3. The polyalkylene ether glycol composition according to claim 2, wherein the number of the hydroxyl group terminals of the dialkylene ether glycol is 2.5 mmol/g or more and 8.6 mmol/g or less.

4. The polyalkylene ether glycol composition according to claim 1, wherein the number of the alkoxy group terminals of the polyalkylene ether glycol including an alkoxy group serving as a terminal group, the polyalkylene ether glycol being included in the polyalkylene ether glycol composition, is 0.001 mmol/g or more and 0.07 mmol/g or less.

5. The polyalkylene ether glycol composition according to claim 1, wherein the polyalkylene ether glycols are polytetramethylene ether glycols.

6. The polyalkylene ether glycol composition according to claim 1, wherein the polyalkylene ether glycols and the polyalkylene ether glycol including an alkoxy group serving as a terminal group have the same structural unit.

7. The polyalkylene ether glycol composition according to claim 2, wherein the polyalkylene ether glycols and the dialkylene ether glycol have the same structural unit.

8. The polyalkylene ether glycol composition according to claim 1, wherein the alkoxy group is an alkoxy group including 4 or less carbon atoms.

9. The polyalkylene ether glycol composition according to claim 8, wherein the alkoxy group is a methoxy group.

10. A method for producing a polyurethane, the method comprising
conducting addition polymerization reaction of a raw material including the polyalkylene ether glycol composition according to claim 1, a compound including a plurality of isocyanate groups, a polyol having a molecular weight of 50 to 300, and a polyalkylene ether glycol having a hydroxyl value of 200 or less.

11. The method for producing a polyurethane according to claim 10, wherein the polyurethane is a polyurethane elastomer.

12. The method for producing a polyurethane according to claim 11, wherein the polyurethane elastomer is a polyurethane foam.

* * * * *